United States Patent
Landsman et al.

(10) Patent No.: US 11,338,225 B2
(45) Date of Patent: May 24, 2022

(54) FILTER AGITATOR

(71) Applicant: The trû Shrimp Company, Balaton, MN (US)

(72) Inventors: Angela Kaye Landsman, Slayton, MN (US); Joshua David Gross, Marshall, MN (US)

(73) Assignee: THE TRU SHRIMP COMPANIES, INC., Balaton, MN (US)

( * ) Notice: Subject to any disclaimer, the term of this patent is extended or adjusted under 35 U.S.C. 154(b) by 44 days.

(21) Appl. No.: 17/009,161

(22) Filed: Sep. 1, 2020

(65) Prior Publication Data
US 2021/0069616 A1    Mar. 11, 2021

Related U.S. Application Data

(60) Provisional application No. 62/896,309, filed on Sep. 5, 2019.

(51) Int. Cl.
*B01D 24/28*   (2006.01)
*B01D 24/40*   (2006.01)
(Continued)

(52) U.S. Cl.
CPC .......... *B01D 24/402* (2013.01); *B01D 24/28* (2013.01); *B01D 24/4652* (2013.01); *C02F 1/001* (2013.01); *C02F 3/08* (2013.01); *C02F 2301/022* (2013.01); *C02F 2301/024* (2013.01); *C02F 2303/16* (2013.01)

(58) Field of Classification Search
None
See application file for complete search history.

(56) References Cited

U.S. PATENT DOCUMENTS 4,287,137 A * 9/1981 Sonoyama .......... B01F 3/04539
                                                261/93
4,818,114 A * 4/1989 Ghavi ................ A47J 43/27
                                                215/11.1
(Continued)

FOREIGN PATENT DOCUMENTS

CN          202942698 U    5/2013
JP         2005161229 A    6/2005
(Continued)

OTHER PUBLICATIONS

PCT/US 20/48917, "International Search Report and Written Opinion", dated Dec. 4, 2020.

*Primary Examiner* — Chester T Barry
(74) *Attorney, Agent, or Firm* — Billion & Armitage

(57) ABSTRACT

Embodiments of the present disclosure describe filter agitators, filtration units comprising the filter agitators, methods of using the filter agitators, and the like. In certain embodiments, the filter agitators comprise a plurality of first fins extending outwardly from a central vertical axis and arranged in a plane oriented substantially perpendicular to the central vertical axis, wherein the plurality of first fins is configured to promote laminar flow of a fluid flowing in a first direction and induce turbulent flow of a fluid flowing in a second direction; and optionally a plurality of second fins positioned above the plurality of first fins and extending outwardly from the central vertical axis, wherein the plurality of second fins is configured to induce or further induce turbulent flow.

20 Claims, 17 Drawing Sheets

(51) Int. Cl.
  B01D 24/46   (2006.01)
  C02F 3/08    (2006.01)
  C02F 1/00    (2006.01)

(56) References Cited

U.S. PATENT DOCUMENTS

| | | | |
|---|---|---|---|
| 5,126,042 A | 6/1992 | Malone | |
| 5,275,790 A * | 1/1994 | Buchholz | B01D 3/009 |
| | | | 422/211 |
| 5,445,740 A | 8/1995 | Malone | |
| 6,787,036 B2 * | 9/2004 | Long | C02F 3/02 |
| | | | 210/629 |
| 7,083,324 B2 * | 8/2006 | Van Drie | B01F 11/0082 |
| | | | 210/150 |
| 7,182,871 B2 * | 2/2007 | Perriello | C02F 3/00 |
| | | | 210/150 |
| 7,553,413 B2 | 6/2009 | Dorian et al. | |
| 8,241,497 B2 * | 8/2012 | Buch | C02F 3/1284 |
| | | | 210/605 |
| 8,528,761 B2 * | 9/2013 | Yarro | B65D 1/0223 |
| | | | 215/382 |
| 10,213,053 B2 * | 2/2019 | Dayton | B01F 13/005 |
| 10,365,014 B2 * | 7/2019 | Nishino | F24H 1/40 |
| 2002/0158013 A1 * | 10/2002 | Van Drie | B01F 15/00525 |
| | | | 210/620 |
| 2004/0013030 A1 * | 1/2004 | Renz | B01F 15/00512 |
| | | | 366/130 |
| 2006/0275105 A1 * | 12/2006 | Roberts | F03D 3/0409 |
| | | | 415/4.2 |
| 2012/0211430 A1 | 8/2012 | Choi | |
| 2016/0250571 A1 | 9/2016 | Bloomfield | |
| 2018/0296947 A1 | 10/2018 | Jackson et al. | |
| 2019/0373843 A1 | 12/2019 | Gervais | |
| 2020/0318913 A1 * | 10/2020 | Ruiz | F28F 7/02 |

FOREIGN PATENT DOCUMENTS

| | | | |
|---|---|---|---|
| KR | 100712643 | B1 | 5/2007 |
| KR | 20130133713 | A * | 12/2013 |
| KR | 101892276 | B1 | 8/2018 |
| TW | M536971 | U | 2/2017 |

* cited by examiner

FILTER AGITATOR

BACKGROUND

In aquaculture, fresh and saltwater species are cultivated in an artificial environment and harvested at maturity. Being raised in such an environment, fresh and saltwater species are particularly vulnerable to disease and infection throughout each stage of their lifecycle. Accordingly, to minimize risks of infection and disease, aquatic environments are subjected to filtration and other treatments to facilitate the removal of waste, contaminants, and other harmful substances from the environment, thereby maximizing the growth potential and health of the species being farmed.

Bead filters can be used for mechanical and biological filtration of aquatic environments. The bead filters typically comprise a plurality of floating plastic beads and, in some configurations, biofilm layers can be formed on the surfaces thereof. As water flows over and around the plastic media, the bead filters are configured to capture and remove solids and other matter from the water through absorption, among other mechanisms. In addition, bacteria on the biofilm layer can be used to break down and/or remove biologics, ammonia, nitrite, and other toxic wastes. However, it remains a challenge to achieve satisfactory biological filtration using conventional systems.

During operation, solids can accumulate on the surfaces of the bead filters and thus the bead filers, at some point, need to be regenerated. Bead filter regeneration faces numerous engineering and operational challenges. For example, the bead filters can be removed for cleaning and reintroduced into the filtration unit. However, normally the filtration unit must be taken offline, so typically either additional filtration units are required or a reactor large enough to remain in operation during the entire lifecycle of the species is required, both of which can be expensive. Other methods destroy the biofilm layer, the regrowth of which is slow, increasing startup costs, among other things.

Accordingly, it would be desirable to devise a means that can be used to improve biological filtration while also providing a quick and easy means for regenerating the bead filters without the costs and operational challenges associated with conventional bead filter operations.

SUMMARY

Filter agitators, filtration units comprising the filter agitators, methods of using the filter agitators, and the like are disclosed herein. The filter agitators can be disposed in a vessel comprising filter media, such as bead filters, to enhance mechanical and/or biological filtration of the fluid. For example, the filter agitators are configured to promote laminar flow of a fluid flowing in a first direction and induce turbulent flow of a fluid flowing in a second direction. For fluids flowing in the first direction, the laminar flow can disperse the fluid over the filter media to enhance or facilitate the capture and removal of solids and other matter, such as biologics. For fluids flowing in the second direction, the turbulent flow can dislodge solids and biologics from the filter media, optionally without destroying or otherwise harming biofilm layers formed on the surface of the filter media, and direct the dislodged solids and other waste towards the drain for removal from the filtration units. In this way, the filter agitators can be used in connection with a variety of systems, including, but not limited to, aquaculture, ponds, public aquariums, zoos, hatcheries, research facilities, aquaponics, quarantine, and environment biological recovery systems, among others.

In a first aspect, the present invention is directed to filter agitators comprising a plurality of first fins extending outwardly from a central vertical axis and arranged in a plane oriented substantially perpendicular to the central vertical axis, wherein the plurality of first fins is configured to promote laminar flow of a fluid flowing in a first direction and induce turbulent flow of a fluid flowing in a second direction. In certain aspects, the filter agitators further comprise a plurality of second fins positioned above the plurality of first fins and extending outwardly from the central vertical axis, wherein the plurality of second fins is configured to induce or further induce turbulent flow. Each of the first fins and/or second fins can be configured with any of multitude of orientations, shapes, surfaces, contours, and/or arrangements designed to achieve the desired flow.

In another aspect, the present invention is directed to a filtration unit comprising a vessel including a fluid inlet for receiving a fluid from a fluid source and a fluid outlet for discharging fluid from the vessel, the vessel further comprising: a bead filter movably positioned within the vessel for providing mechanical and biological filtration of the fluid flowing through the vessel; a filter agitator disposed within the vessel and comprising a plurality of fins, each of the fins having a proximal end that forms an inner conduit, wherein the filter agitator is configured to promote laminar fluid flow in a first direction and turbulent fluid flow in a second direction; and an air inlet optionally provided in a bottom portion of the housing for introducing air into the inner conduit.

In a further aspect, the present invention is directed to methods of using the filter agitators disclosed herein, the methods comprising: flowing a fluid in a first direction over a filter agitator of the present disclosure, wherein the filter agitator promotes laminar flow of the fluid flowing in the first direction, and flowing a fluid in a second direction over the filter agitator, wherein the filter agitator induces turbulent flow of the fluid flowing in the second direction. In some embodiments, the method further comprises opening an air inlet to introduce air into an inner conduit formed by the proximal ends of the filter agitator.

The details of one or more examples are set forth in the description below. Other features, objects, and advantages will be apparent from the description and from the claims.

BRIEF DESCRIPTION OF DRAWINGS

This written disclosure describes illustrative embodiments that are non-limiting and non-exhaustive. In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

Reference is made to illustrative embodiments that are depicted in the figures, in which.

DETAILED DESCRIPTION

Figure 1A:
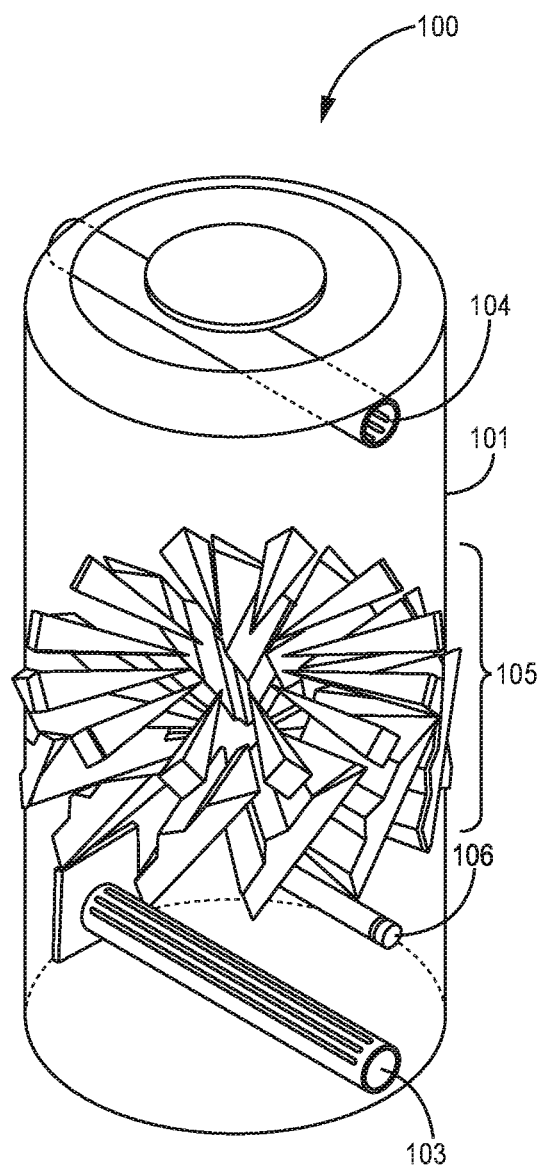
FIGS. 1A-1B provide (A) a perspective view of a filtration unit and (B) a side view of a filtration unit, according to one or more embodiments of the present disclosure.
Figure 1B:
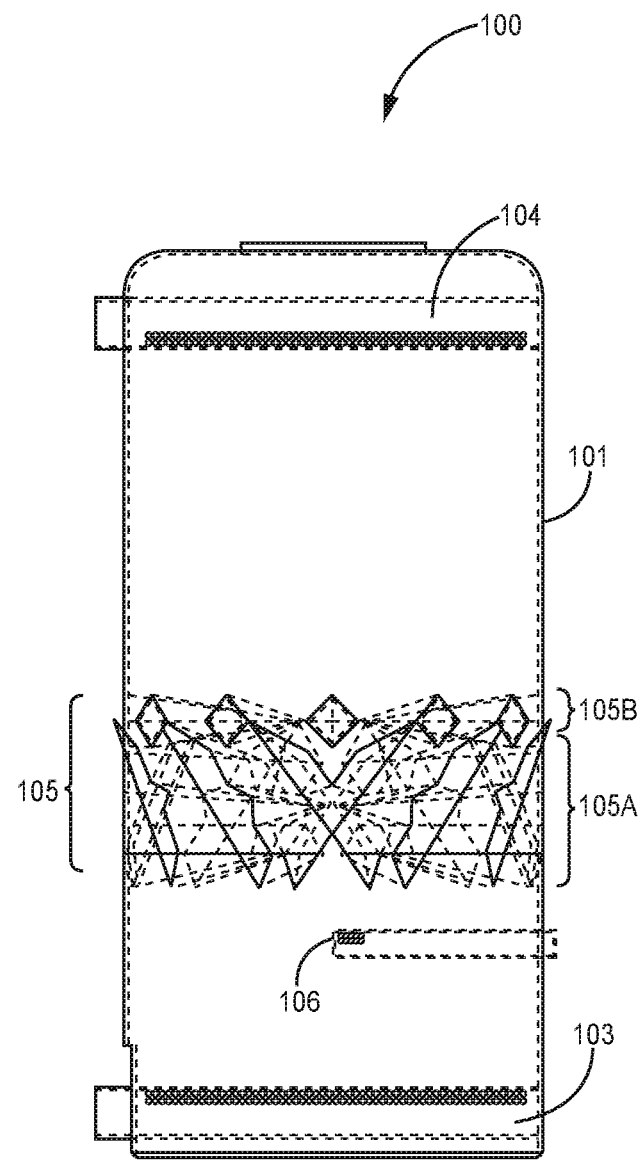

FIGS. 1A-1B provide a (A) perspective view and (B) side view of a filtration unit, according to one or more embodiments of the present disclosure. In general, the filtration units comprise a vessel having one or more fluid inlets and/or one or more fluid outlets. As shown in FIGS. 1A-1B, the filtration unit 100 comprises a constant-diameter vessel 101. Another type of vessel that can be used herein is a vessel with a variable diameter, such as an hour glass-shaped vessel, among others. The vessel 101 includes a fluid inlet 103 in a bottom portion of vessel 101 and a fluid outlet 104 in a top portion of the vessel 101. The fluid inlet 103 can be configured to receive a fluid from a fluid source. The fluid outlet 104 can be configured to discharge a fluid from the vessel 101. Although the fluid inlet 103 and fluid outlet 104 are shown in the bottom and top portions of the vessel 101, respectively, the positioning of the fluid inlet 103 and fluid outlet 104 are not particularly limited and thus can be provided at any vessel position. The vessel can further comprise a drain 108 (not shown) in a bottom portion of the vessel 101. The drain can be configured to remove waste from the vessel 101 and/or filtration unit 100.

Each of the fluid inlets 103 and fluid outlets 104 can be configured to receive or discharge a fluid from or to any fluid source or system. In some embodiments, the fluid source and/or system is an aquaculture filtration system. For example in some embodiments, the fluid source and/or system is a tidal basin for aquaculture, such as tidal basins described in co-owned U.S. patent application Ser. No. 16/433,887 to The trū Shrimp Company, entitled "Raceways and Systems Thereof," the disclosure of which is hereby incorporated by reference in its entirety. In some embodiments, the fluid source and/or system is a raceway pond. In some embodiments, the fluid source and/or system is a bioreactor. In some embodiments, the fluid source and/or system is a component or unit operation of a waste water treatment system. For example, in some embodiment, the fluid source and/or system is another vessel. In some embodiments, the fluid source and/or system is a filtration tank. In some embodiments, the fluid source and/or system is an inoculation tank. In some embodiments, the fluid source and/or system is a waste water treatment system.

A filter agitator 105 is disposed within vessel 101 between the fluid inlet 103 and fluid outlet 104. The filter agitator 105 can optionally be secured or mounted to the vessel 101. As shown, the filter agitator 105 comprises a plurality of first fins 105A extending outwardly from a central vertical axis and an optional plurality of second fins 105B positioned above the plurality of first fins and extending outwardly from the central vertical axis. Each of the plurality of fins 105A and 105B, and the filter agitator 105 as a whole, are configured to promote laminar flow of a fluid flowing in a first direction and induce turbulent flow of a fluid flowing in a second direction. The plurality of fins 105A and/or 105B or a supporting structure can optionally form, in the filter agitator, an inner conduit, which is typically, but not necessarily, centered on the central vertical axis. An air inlet 106 can open up into the inner conduit of the filter agitator 105. For example, while operating the filtration unit in a back-flushing phase (discussed below), the air inlet 106 can be opened and the introduced air can induce further turbulence to facilitate the dislodging of solids from bead filters, for example. The positioning of the air inlet 106 is not particularly limited. For example, in certain embodiments, the air inlet 106 is provided in or near the bottom portion of the vessel 101.

A filter media 107 (not shown) can further be disposed within the vessel 101. The filter media 107 is typically, but not necessarily, movably positioned within the vessel 101. For example, the filter media 107 can float or at least remain suspended in the vessel in the presence of a fluid. Accordingly, in some embodiments, the filter media 107 is provided above the filter agitator 105. In some embodiments, the filter media 107 is provided below the filter agitator 105. In some embodiments, the filter media 107 comprises bead filters. Bead filters are generally buoyant media used for mechanical and/or biological filtration. For example, in some embodiments, during operation of the filtration unit 100 in a filtering phase (discussed below), the filter media 107 can capture biological matter, solid matter, and other types of matter from a fluid flowing over and/or through the filter media 107. In some embodiments, a biofilm or biofilm layer is formed on the surface of the filter media 107 and used to remove said solids and/or other matter. Over the course of operation, the filter media 107 can accumulate waste on the surfaces thereof. The filter agitator 105 can be used to dislodge said waste, optionally without damaging or otherwise harming the biofilm layer, if present.

The filtration unit 100 can be utilized in various operating phases, including a filtering phase and/or back-flushing phase. Examples of the various phases in which the filtration units can be operated are described in co-owned U.S. Provisional Patent Application Ser. No. 62/863,373 to The trū Shrimp Company, entitled "Aquaculture Filtration Systems," the disclosure of which is hereby incorporated by reference in its entirety. While operating in a filtering phase, the filtration unit 100 is configured to remove solids and other particulate matter from a fluid flowing through the vessel 101 (e.g., to provide biological and/or mechanical filtration). For example, in some embodiments, a fluid can enter vessel 101 through fluid inlet 103 and proceed to flow upwardly through the vessel 101. The filter agitator 105, being configured to promote laminar flow of the fluid, disperses the fluid over the filter media 107 as it flows upwardly through the vessel 101 to facilitate the capture and removal of solids and other matter from the fluid. After passing over the filter media 107, the fluid can exit vessel 101 through fluid exit 104.

In a back-flushing phase, the filtration unit 100 is configured or effective to dislodge solids from the filter media 107 and optionally to direct the dislodged solids and other accumulated waste towards a drain 108 (not shown), where said solids and waste can exit the vessel 101. For example, in some embodiments, the back-flushing phase is initiated by temporarily stopping the filtering phase such that fluid flow ceases between fluid inlet 103 and fluid outlet 104. Prior to, contemporaneously with, or subsequent to the stopping of the filtering phase, one or more of the air inlet 106 and the drain 108 can be opened. Upon opening either or both of the air inlet 106 and drain 108, the fluid flows downwardly through the vessel 101. As the fluid flows downwardly, it flows over the filter agitator 105 which has a plurality of fins 105A and/or 105B with surfaces configured to induce turbulent flow. The turbulent flow causes the filter media to dislodge solids from the surfaces of the filter media through collisions and/or other forces. If the air inlet is open, as the fluids flow downwardly through vessel 101, the introduced air rises or flows upwardly through the inner conduit of the filter agitator, further inducing turbulent flow and facilitating the dislodging of solids and other matter from the media filter 107. In some embodiments, the center region of the vessel—e.g., where the air percolates upwardly through the vessel—can be the most turbulent region. The filter agitator 105 can also aid in directing other waste and dislodged solids towards the drain as the fluid flows downwardly.

The filter agitators disclosed herein can comprise fins having any surface geometry, arrangement, and/or orientation suitable for promoting laminar flow of a fluid flowing in a first direction and induce turbulent flow of a fluid flowing in a second direction. In some embodiments, each fin has one or more substantially upwardly facing surfaces and one or more substantially downwardly facing surfaces. For example, in some embodiments, each fin has two substantially upwardly facing surfaces that converge to form an upwardly facing apex. In some embodiments, each fin has two substantially downwardly facing surfaces that converge to form a downwardly facing apex. In some embodiments, each fin has a front side and a back side. A front side can be characterized as having one or more substantially upwardly facing surfaces. A backside can be characterized as having one or more substantially downwardly facing surfaces. In some embodiments, a surface (e.g., a front side) has a plurality of angled surfaces that create protrusions on the front side. In some embodiments, a surface (e.g., backside) has a substantially flat surface (e.g., without any protrusions formed on the surface). In other embodiments, the front side can comprise two surfaces that meet to form an apex and the back side can comprise two surfaces that meet to form an apex. These shall not be limiting as other configurations are possible and within the scope of the present disclosure. For example, in some embodiments, the front side has a substantially flat surface and the backside has a plurality of angled surfaces.

The fins can be made of metal or plastics or other polymeric materials, among other types of materials, which are generally not particularly limited. As noted above, the filter agitators can comprise a plurality of first fins extending outwardly from a central vertical axis. The plurality of first fins can be arranged in a plane oriented perpendicular or substantially perpendicular to the central vertical axis (e.g., arranged in a substantially horizontal plane). Each of the plurality of first fins can also be evenly or about uniformly spaced apart about the central vertical axis. Other configurations are possible. In some embodiments, the first plurality of fins is arranged in a plane other than one that is oriented perpendicular or substantially perpendicular to the central vertical axis. For example, the first plurality of fins can be arranged in a plane oriented at a non-perpendicular angle relative to the central vertical axis. In other embodiments, the plurality of first fins comprises two or more fins oriented in different planes and thus the plurality of first fins cannot be said generally to be oriented in any singular plane. In some embodiments, each of the fins of the plurality of first fins is non-uniformly spaced apart about the central vertical axis.

The spacing between each of the fins can vary depending on vessel size, bead filter size (e.g., average bead diameter), and mode of operation, among other things. In general, the spacing or distance between each fin is usually at least equal to or greater than the diameter of a bead filter. For example, it can be important for the fins to be spaced apart sufficient to allow the beads, during normal operation, to flow above or below the filter agitator, depending on the direction of water flow and the type of flow (e.g., turbulent and/or laminar flow). If the spacing is too narrow, the bead filters can overly restrict water flow such that turbulent flow cannot be achieved while operating in, for example, a back-flushing phase. If the spacing is too wide, then the bead filters can fail to capture and remove any appreciable amount of solids and other matter while operating in, for example, a filtering phase. The fin spacing is also a parameter that can be modulated or adjusted to optimize solids removal from water and/or solids dislodging from the bead surfaces, among other things.

In some embodiments, the fin spacing is at least equal to or greater than the diameter of a bead filter. In some embodiments, the fin spacing is not greater than ten times the diameter of a bead filter, not greater than nine times the diameter of the bead filter, not greater than eight times the diameter of the bead filter, not greater than seven times the diameter of a bead filter, not greater than six times the diameter of a bead filter, not greater than five times the diameter of a bead filter, not greater than four times the diameter of a bead filter, not greater than three times the diameter of a bead filter, not greater than two times the diameter of a bead filter, not greater than 1.5 times the diameter of a bead filter, not greater than 1.25 times the diameter of a bead filter, or any increment or value thereof.

The plurality of first fins can be sufficient, without for example the plurality of second fins, to promote laminar flow of a fluid flowing in a first direction and induce turbulent flow of a fluid flowing in a second direction. In some instances, however, it may be difficult to obtain the desired degree of turbulence with only the plurality of first fins for any of a variety of reasons. For example, the filtration unit itself can have characteristics that prevent the fluid from achieving the desired level of turbulence during back-flushing, or limitations in the flow rates through the air inlet and/or drain can prevent or restrict turbulent flow, among other things. Accordingly, in some embodiments, it may be desirable to provide a filter agitator that further comprises a plurality of second fins, wherein the plurality of second fins is configured to further induce turbulent flow and/or promote laminar flow.

The filter agitators can thus optionally further comprise a plurality of second fins extending outwardly from the central axis. The plurality of second fins can be positioned above, or in some embodiments below, the plurality of first fins. The arrangement and spacing of the plurality of second fins can be similar to the plurality of first fins. For example, the plurality of second fins can be arranged in a plane oriented perpendicular or substantially perpendicular to the central vertical axis, and the fins can be about evenly or uniformly spaced apart about the central vertical axis. Other configurations are possible. In some embodiments, the plurality of second fins is arranged in a plane other than one that is oriented perpendicular or substantially perpendicular to the central vertical axis. For example, the plurality of second fins can be arranged in a plane oriented at a non-perpendicular angle relative to the central vertical axis. In other embodiments, the plurality of second fins comprises two or more fins oriented in different planes and thus the plurality of second fins cannot be said generally to be oriented in any singular plane. In some embodiments, the second fins are non-uniformly spaced apart about the central vertical axis.

The positioning of the plurality of second fins relative to the plurality of first fins is not particularly limited. For example, the plurality of second fins can be arranged in a plane oriented parallel or substantially parallel to the plane in which the plurality of first fins is arranged. In other embodiments, the plurality of second fins can be arranged in a plane oriented non-parallel to the plane in which the plurality of first fins is arranged. The plurality of second fins can further be positioned over or in the gaps formed between each of the fins of the plurality of first fins. In these embodiments, the plurality of second fins and plurality of first fins can be said to be in a staggered configuration. In other embodiments, the plurality of second fins can be positioned directly over, overlap with, and/or be offset from the first fins. These shall not be limiting as other arrangements, configurations, and orientations are possible and thus within the scope of the present disclosure.

Each fin of the plurality of first fins and/or second fins can have a proximal end and a distal end. The proximal end is the end of the fin that is nearest in proximity to the central vertical axis. The distal end is the end of the fin that is farthest in proximity to central vertical axis. The length of the plurality of fins, or the positioning of the proximal and distal ends of the plurality of fins, along an axis oriented perpendicular to the central vertical axis, is not particularly limited so long as each fin is configured or adapted to fit within a filtration unit. A typical filter agitator will comprise a plurality of fins having a proximal end positioned at a select distance from the central vertical axis and a distal end that extends near or preferably to a vessel wall or sidewall of the filtration unit. For example, in some embodiments, the proximal ends of the plurality of fins can each be positioned away from the central vertical axis. In these embodiments, the proximal ends can form, define, or contribute to the shape of an inner conduit, and the distal ends of the plurality of fins can extend all the way to the vessel wall of a filtration unit. Other configurations can be utilized and thus these shall not be limiting.

In some embodiments, the first fins, second fins, or both the first fins and second fins have uniform or non-uniform (e.g., variable) cross-sectional areas. For example, in some embodiments, each first fin has a cross-sectional area that increases from a proximal end to a distal end. In some embodiments, each first fin has a cross-sectional area that increases from a distal end to a proximal end. In some embodiments, each second fin has a cross-sectional area that increases from a proximal end to a distal end. In some embodiments, each second fin has a cross-sectional area that increases from a distal end to a proximal end. In some embodiments, a cross-section of each first fin and/or second fin has a triangular-like, rectangular-like, diamond-like, square-like, spherical-like, or elliptical-like shape, among any other geometric shape known in the art.

The proximal ends of the plurality of first fins, plurality of second fins, or both the plurality of first fins and plurality of second fins can form or define, at least partially, an inner conduit. The diameter or size of the inner conduit can be in the range of about 0 percent to about 100 percent of the diameter of the vessel, preferably about 35% to about 65%, more preferably about 45% to about 55%. For example, in some embodiments, the proximal ends of the plurality of first fins and/or second fins are positioned at select distances from the central vertical axis such that those ends form or define an inner conduit. Preferably, the proximal ends of the first fins and/or second fins are positioned at equal or about equal distances from the central vertical axis, although this is not required and thus the distances of the proximal ends of the plurality of first fins and/or plurality of second fins from the central vertical axis can vary. In addition or in the alternative, in some embodiments, the inner conduit can be defined or further defined by a hollow portion of a structural member, which as described below, can provide support to and/or secure one or more of the plurality of first fins and/or plurality of second fins.

The structural member is optional. For example, in some embodiments, the plurality of first fins and/or plurality of second fins is secured and/or immobilized in the vessel using securing members configured to attach or fix each of the plurality of first fins and/or second fins to the vessel walls of the filtration unit. In these embodiments, the structural member may be present or it may be absent. The securing members are not particularly limited. For example, suitable securing members can be selected from mechanical fasteners, such as screws; chemical materials, such as adhesives; or combinations thereof. Other securing members are known in the art and thus these shall not be limiting. In other embodiments, a structural member is provided to support, secure, and/or immobilize each of first fins and/or second fins within the vessel of the filtration unit such that the positioning of the first and/or second fins is not significantly altered during, for example, turbulent flow or other operative use of the fins. In addition or in the alternative, the structural member can also be configured to permit the removal of the first and/or second fins from the vessel for cleaning.

In certain embodiments, the structural member is a cylindrical structural member or cylindrically-shaped structural member. Said structural member can have slots or grooves that are fitted to receive and secure and/or support each of the plurality of first fins and/or second fins. The filter agitator can be assembled, at least in part, by inserting each of the plurality of fins into a groove provided on the cylindrical structure. As noted above, the cylindrical hollow portion of the structural member can form, define, or further define all or a portion of the inner conduit. While a cylindrical structure is described herein, it is only an example, as the shape of the structural member and grooves is not particularly limited and thus other shapes can be employed without departing from the scope of the present invention. In addition or in the alternative, the plurality of first fins and/or second fins can further be attached or fixed to the vessel walls of the filtration unit using one or more securing members.

In some embodiments, the filter agitator comprises the plurality of second fins, and each first fin is attached to a second fin to form a single combined fin. For example, in some embodiments, a three-dimensional printer can be used to fabricate fins such that the first fin is printed with the second fin to form a single combined fin. In these embodiments, a structural member is optional. At least one advantage of these embodiments is that the structural member or securing member only needs to have slots or grooves configured to receive and secure the plurality of first fins— as opposed to being configured to receive and secure the plurality of first fins and the plurality of second fins—given that each of the plurality of first fins is connected to a second fin to form a single piece. In other embodiments, an attaching member, such as a fastener or screw, can be used to attach each first fin to a second fin.

It is not required that the plurality of first fins and/or second fins be immobilized. For example, in some embodiments, one or more of the plurality of first fins and second fins, if present, can be mobilized, or not immobilized. That is, the plurality of first fins and/or second fins can be mobilized such that the plurality of first fins and/or second fins are free to rotate about a central vertical axis. In some embodiments, the plurality of fins are rotatably attached to a vertical support member. In some embodiments, a fluid causes the rotatably attached plurality of fins to rotate. In some embodiments, the rotation of the plurality of fins induces greater turbulent flow. These shall not be limiting as other configurations and attachments can be used to induce or not induce turbulent flow.

Figure 2A:
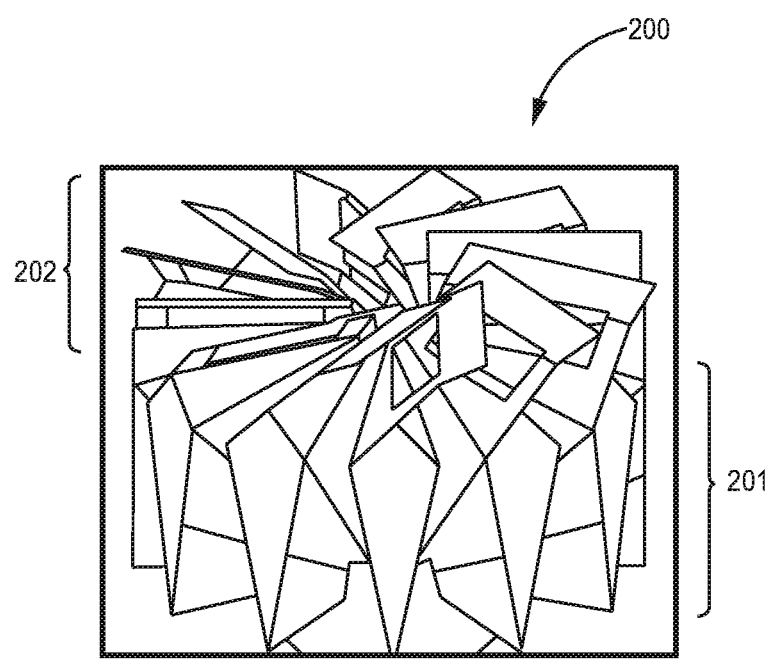
FIGS. 2A-2C provide (A) a perspective view of a filter agitator, (B) a top view looking down onto a filter agitator, and (C) a side view of a filter agitator, according to one or more embodiments of the present disclosure.
Figure 2B:
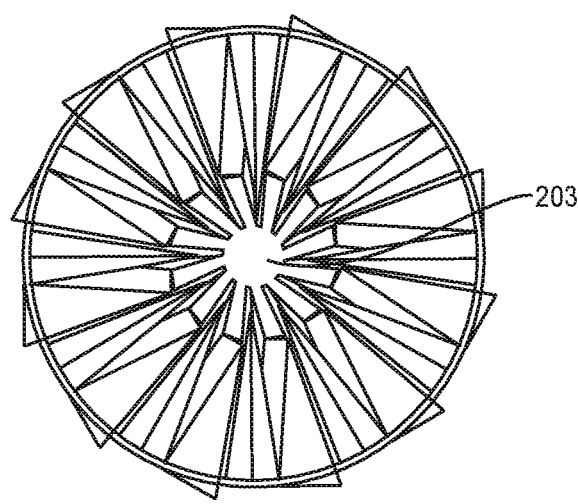
Figure 2C:
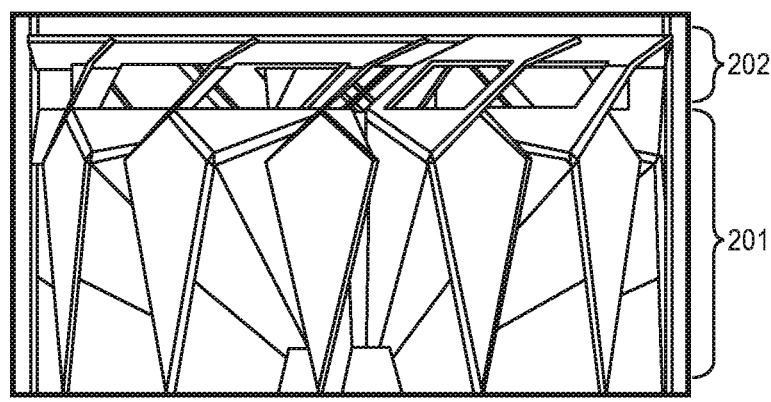

FIGS. 2A-2C provide a (A) perspective view, (B) top view, and (C) side view of a filter agitator, according to one or more embodiments of the present disclosure. As shown, the filter agitator 200 comprises a plurality of first fins 201 extending outwardly or radially from a central vertical axis and the plurality of second fins 202 (optional) positioned above the plurality of first fins 201 and extending outwardly from the central vertical axis. The plurality of first fins 201 and second fins 202 are arranged in a plane oriented perpendicular or substantially perpendicular to the central vertical axis (e.g., arranged in a substantially horizontal plane). The first fins 201 and second fins 202 are also about evenly or uniformly spaced apart about the central vertical axis. Relative to the plurality of first fins 201, the plurality of second fins 202 are arranged in a plane oriented parallel or substantially parallel to the plane in which the plurality of first fins 201 is arranged. The plurality of second fins generally define a cylindrical inner conduit 203. The plurality of first fins have a proximal end that extends slightly inwardly past the outer perimeter of the inner conduit 203 and can be considered to form a second inner conduit 204 (not shown).

The first fins are characterized by a diamond-shaped cross section, each first fin having two substantially upwardly facing surfaces that meet to form an apex and two substantially downwardly facing surfaces that meet to form a nadir. Each first fin is symmetrical over a long vertical axis. The length of the two substantially downwardly facing surfaces is greater than the length of the two substantially upwardly facing surfaces. The longer length of the downwardly facing fins promotes laminar flow of a fluid flowing upwardly over and/or through the first fins. The shorter length of the upwardly facing fins promotes or induces turbulent flow of a fluid flowing downwardly over and/or through the first fins. The first fins also have a variable cross-section that increases along a horizontal axis from the proximal end to the distal end of each first fin. Further, the first fins are arranged or oriented in a zero-tilt or no-tilt configuration, meaning that the first fins are arranged substantially vertical or have a long vertical axis that is substantially parallel to the central vertical axis.

The second fins are characterized by a rectangular cross-section, each second fin having a cross-sectional thickness that is much less than a length of the second fin, essentially forming a rectangular plate. The cross-sectional area of the second fins is substantially uniform or non-variable, and thus does not significantly change from the proximal end to the distal end of each second fin. The second fins overlap with the first fins and with the gaps formed between each of the first fins. In addition, unlike the first fins, the second fins are arranged or oriented in a tilted configuration, meaning one or more of the substantially upwardly facing surface and downwardly facing surface is not parallel or substantially parallel to a horizontal axis. In said tilted configuration, the second fins can contribute to or further induce turbulent flow of a fluid flowing downwardly over and/or through the plurality of second fins, while also dispersing a fluid flowing upwardly over and/or through the plurality of second fins over filter media (not shown).

Figure 3A:
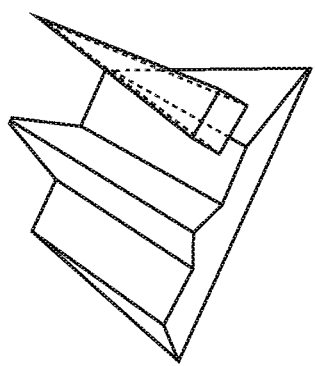
FIGS. 3A-3C provide (A) perspective and (B) and (C) side views of a first fin and a second fin, according to one or more embodiments of the present disclosure.
Figure 3B:
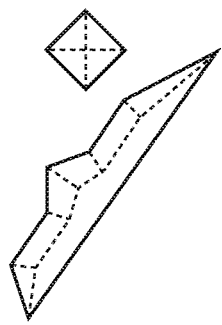
Figure 3C:
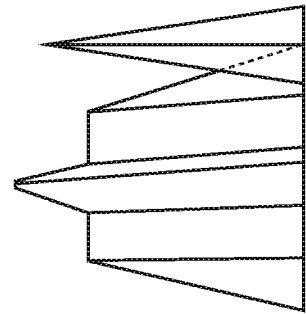

FIGS. 3A-3C provide perspective views of a first fin and a second fin of a filter agitator, according to one or more embodiments of the present disclosure. As shown, the first fin has a backside and a front side. The backside is oriented at an angle with a substantially flat downwardly facing surface. The angled substantially flat surface is configured to promote laminar flow of the fluid and disperse the fluid over a filter media (not shown) while operating in a filtering phase. The front side has a plurality of protrusions that are configured to induce turbulent flow of the fluid and dislodge solids and other matter from the surfaces of the filter media while operating in a back-flushing phase. The cross-sectional area of the first fin generally increases from a proximal end to a distal end. The second fin is generally positioned above the first fin. The second fin has an about diamond-shaped cross-section characterized by two substantially downwardly facing surfaces and two substantially upwardly facing surfaces. The cross-section area of the second fin generally increases from a proximal end to a distal end.

Figure 4:
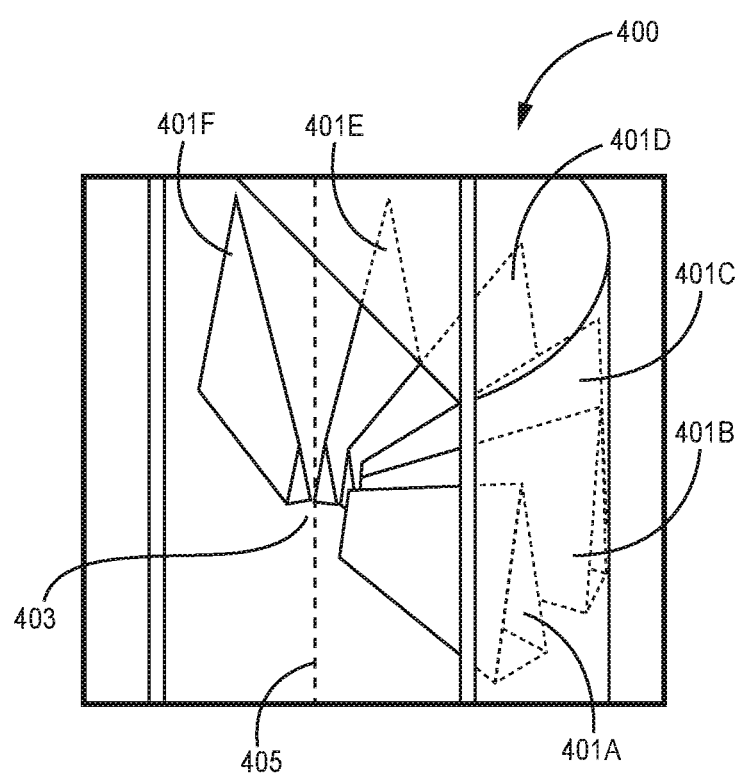
FIG. 4 is a perspective view of a filter agitator (the drawing omits about one-half of the fins to aid in showing various aspects of the filter agitator; however, a full array of fins is contemplated despite being omitted), according to one or more embodiments of the present disclosure.

FIG. 4 provides a partial view of a filter agitator 400, according to one or more embodiments of the present disclosure. As shown, the filter agitator 400 comprises a plurality of fins 401A, 401B, 401C, 401D, 401E, 401F extending outwardly from a central vertical axis 405 and arranged in a plane oriented substantially perpendicular to the central vertical axis 405 (e.g., in a substantially horizontal plane). Each of the plurality of fins 401A, 401B, 401C, 401D, 401E, 401F is about uniformly spaced apart. A proximal end of each fin defines an about cylindrical inner conduit 403 and a distal end extends outwardly therefrom to about a vessel wall. Each of the plurality of fins 401A, 401B, 401C, 401D, 401E, 401F has a triangular-shaped cross section characterized by two substantially upwardly facing surfaces that meet to form an apex and a single downwardly facing horizontal surface. The plurality of fins 401A, 401B, 401C, 401D, 401E, 401F is arranged in a no-tilt configuration, with a variable cross-section that increases along a horizontal axis from the proximal end to the distal end of each fin.

Figure 5:
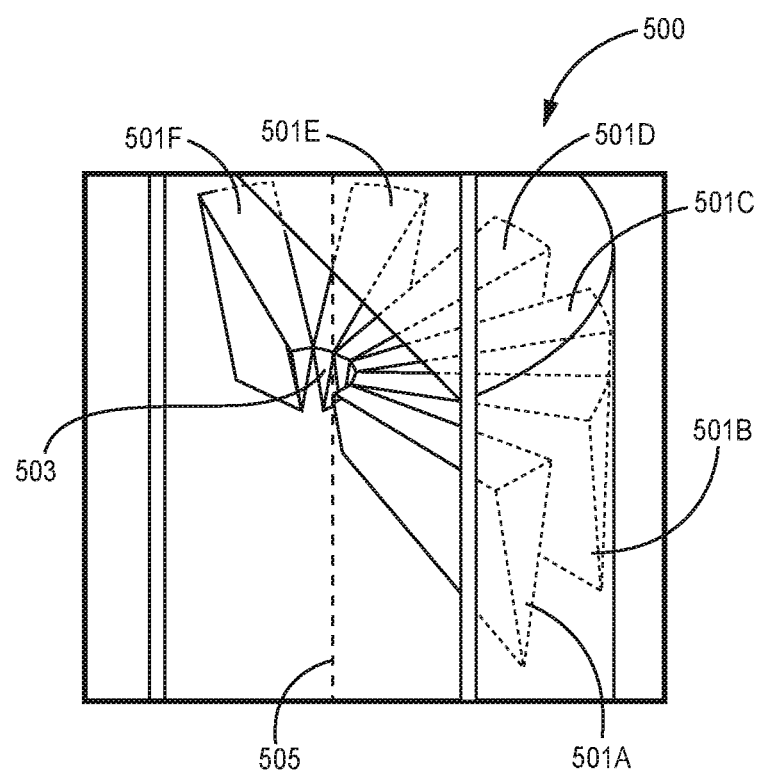
FIG. 5 is a perspective view of a filter agitator (the drawing omits about one-half of the fins to aid in showing various aspects of the filter agitator; however, a full array of fins is contemplated despite being omitted), according to one or more embodiments of the present disclosure.

FIG. 5 provides a partial view of a filter agitator 500, according to one or more embodiments of the present disclosure. As shown, the filter agitator 500 comprises a plurality of fins 501A, 501B, 501C, 501D, 501E, 501F extending outwardly from a central vertical axis 505 and arranged in a plane oriented substantially perpendicular to the central vertical axis 505 (e.g., in a substantially horizontal plane). Each of the plurality of fins 501A, 501B, 501C, 501D, 501E, 501F is about uniformly spaced apart. A proximal end of each fin defines an about cylindrical inner conduit 503 and a distal end extends outwardly therefrom to about a vessel wall. Each of the plurality of fins 501A, 501B, 501C, 501D, 501E, 501F has a triangular-shaped cross section characterized by two substantially downwardly facing surfaces that meet to form an apex and a single upwardly facing horizontal surface. The plurality of fins 501A, 501B, 501C, 501D, 501E, 501F is arranged in a no-tilt configuration, with a variable cross-section that increases along a horizontal axis from the proximal end to the distal end of each fin.

Figure 6:
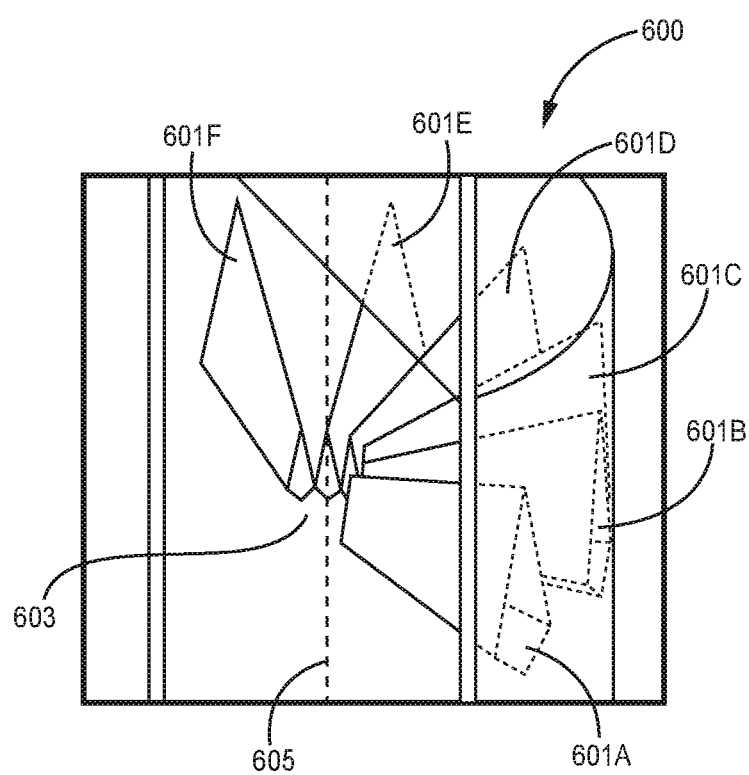
FIG. 6 is a perspective view of a filter agitator (the drawing omits about one-half of the fins to aid in showing various aspects of the filter agitator; however, a full array of fins is contemplated despite being omitted), according to one or more embodiments of the present disclosure.

FIG. 6 provides a partial view of a filter agitator 600, according to one or more embodiments of the present disclosure. As shown, the filter agitator 600 comprises a plurality of fins 601A, 601B, 601C, 601D, 601E, 601F extending outwardly from a central vertical axis 605 and arranged in a plane oriented substantially perpendicular to the central vertical axis 605 (e.g., in a substantially horizontal plane). Each of the plurality of fins 601A, 601B, 601C, 601D, 601E, 601F is about uniformly spaced apart. A proximal end of each fin defines an about cylindrical inner conduit 603 and a distal end extends outwardly therefrom to about a vessel wall. Each fin 601A, 601B, 601C, 601D, 601E, 601F is symmetrical over a longitudinal centered vertical axis. In addition, each of the plurality of fins 601A, 601B, 601C, 601D, 601E, 601F has a diamond-shaped cross section characterized by two substantially upwardly facing surfaces that meet to form an apex and two substantially downwardly facing surfaces that meet to form a nadir. The length of each of the two substantially upwardly facing surfaces is greater than the length of each of the two substantially upwardly facing surfaces. The plurality of fins 601A, 601B, 601C, 601D, 601E, 601F is arranged in a no-tilt configuration, with a variable cross-section that increases along a horizontal axis from the proximal end to the distal end of each fin.

Figure 7:
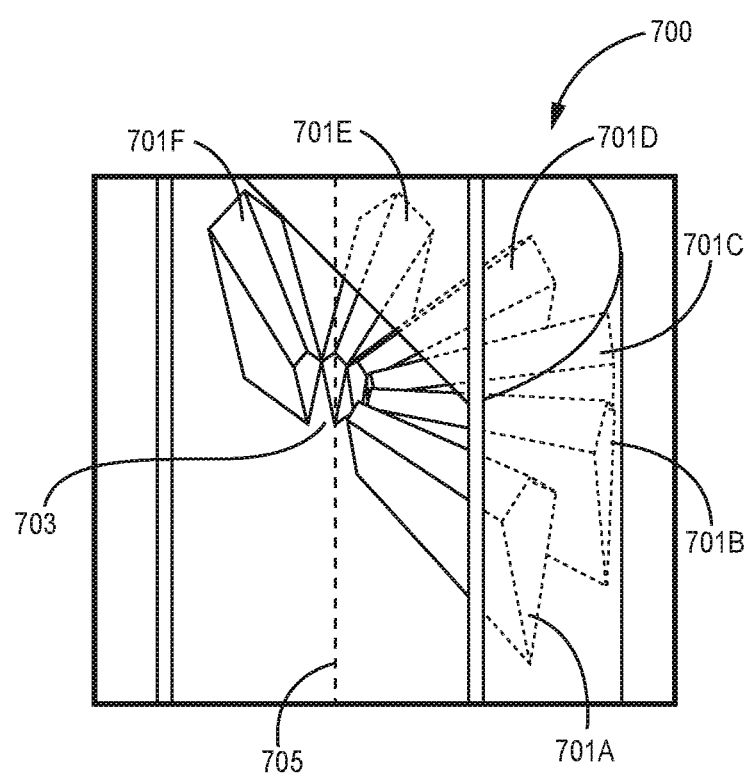
FIG. 7 is a perspective view of a filter agitator (the drawing omits about one-half of the fins to aid in showing various aspects of the filter agitator; however, a full array of fins is contemplated despite being omitted), according to one or more embodiments of the present disclosure.

FIG. 7 provides a partial view of a filter agitator 700, according to one or more embodiments of the present disclosure. As shown, the filter agitator 700 comprises a plurality of fins 701A, 701B, 701C, 701D, 701E, 701F extending outwardly from a central vertical axis 705 and arranged in a plane oriented substantially perpendicular to the central vertical axis 705 (e.g., in a substantially horizontal plane). Each of the plurality of fins 701A, 701B, 701C, 701D, 701E, 701F is about uniformly spaced apart. A proximal end of each fin defines an about cylindrical inner conduit 703 and a distal end extends outwardly therefrom to about a vessel wall. Each fin 701A, 701B, 701C, 701D, 701E, 701F is symmetrical over a longitudinal centered vertical axis. In addition, each of the plurality of fins 701A, 701B, 701C, 701D, 701E, 701F has a diamond-shaped cross section characterized by two substantially upwardly facing surfaces that meet to form an apex and two substantially downwardly facing surfaces that meet to form a nadir. The length of each of the two substantially downwardly facing surfaces is greater than the length of each of the two substantially upwardly facing surfaces. The plurality of fins 701A, 701B, 701C, 701D, 701E, 701F is arranged in a no-tilt configuration, with a variable cross-section that increases along a horizontal axis from the proximal end to the distal end of each fin.

Figure 8:
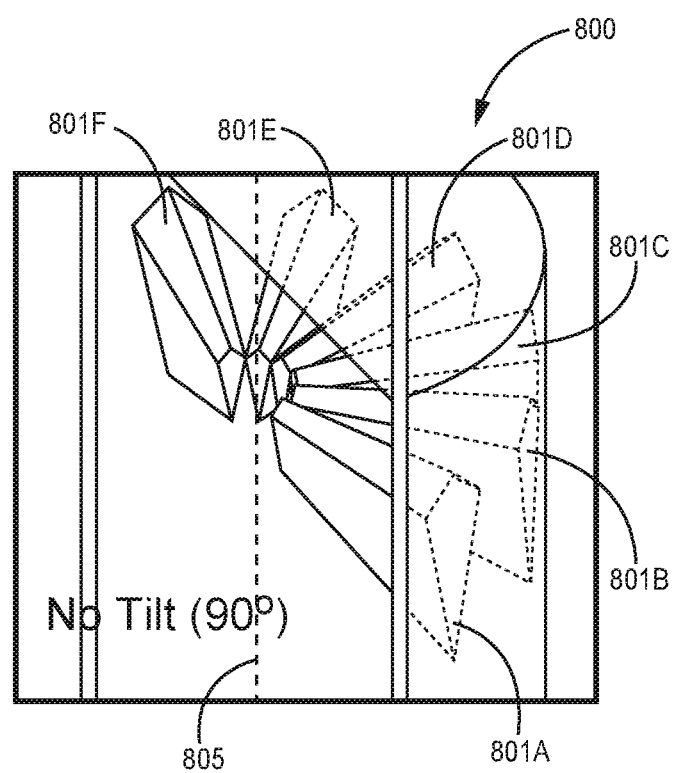
FIG. 8 is a perspective view of a filter agitator (the drawing omits about one-half of the fins to aid in showing various aspects of the filter agitator; however, a full array of fins is contemplated despite being omitted), according to one or more embodiments of the present disclosure.
Figure 9:
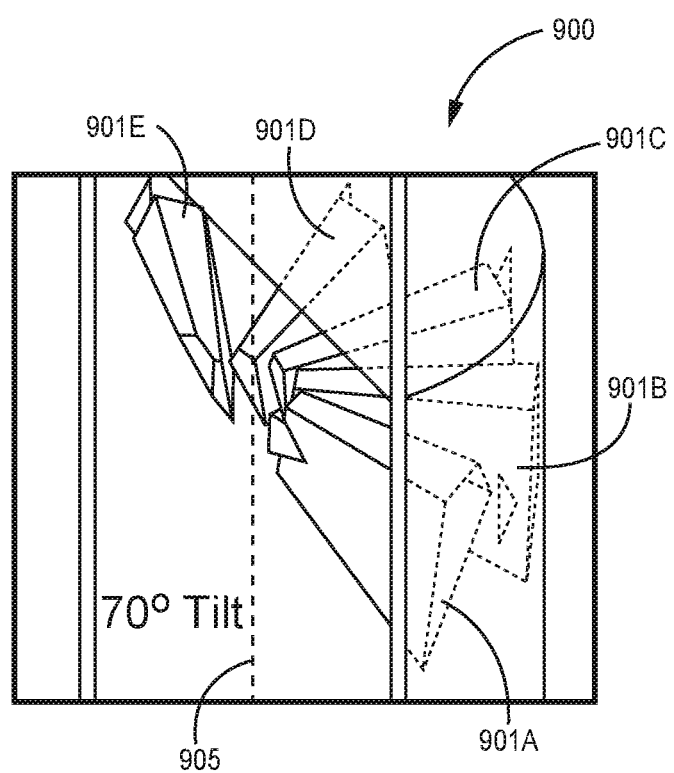
FIG. 9 is a perspective view of a filter agitator (the drawing omits about one-half of the fins to aid in showing various aspects of the filter agitator; however, a full array of fins is contemplated despite being omitted), according to one or more embodiments of the present disclosure.
Figure 10:
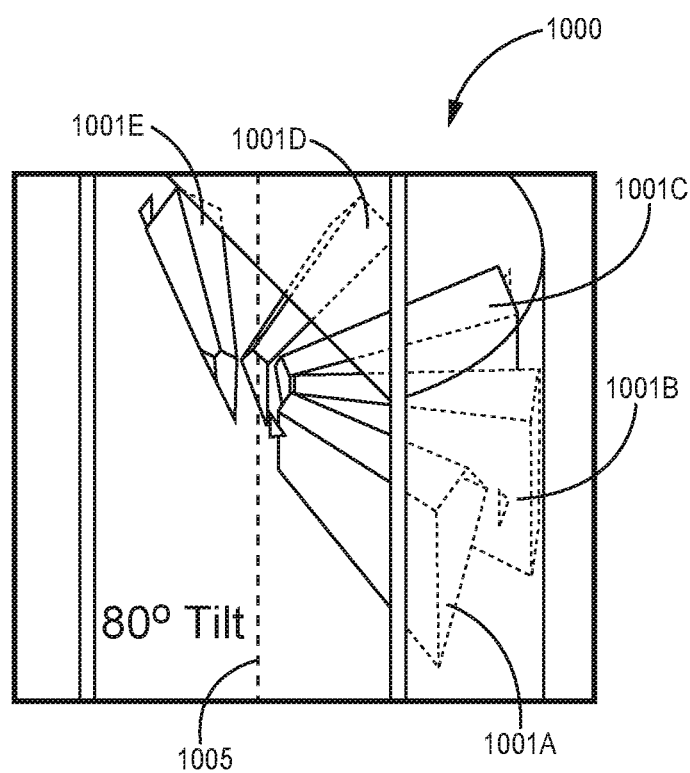
FIG. 10 is a perspective view of a filter agitator (the drawing omits about one-half of the fins to aid in showing various aspects of the filter agitator; however, a full array of fins is contemplated despite being omitted), according to one or more embodiments of the present disclosure.
Figure 11:
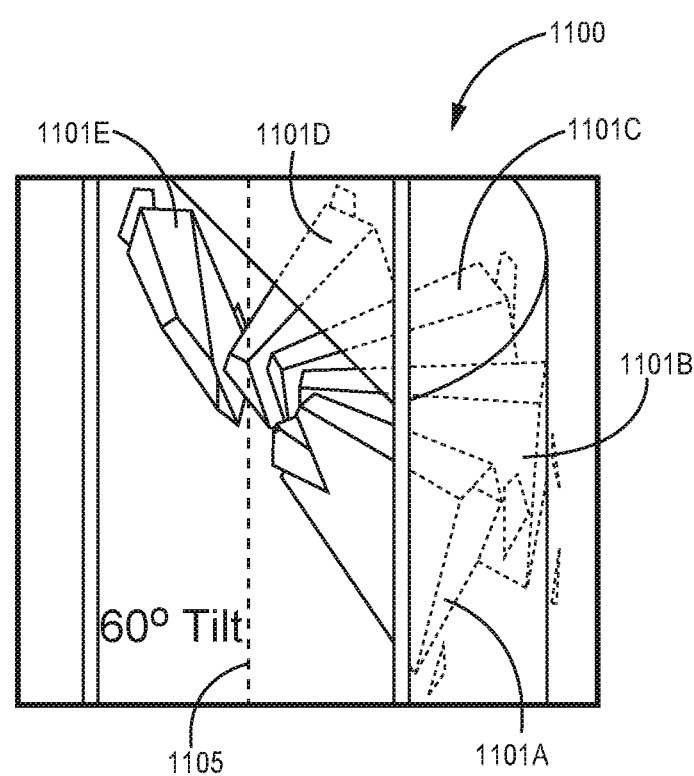
FIG. 11 is a perspective view of a filter agitator (the drawing omits about one-half of the fins to aid in showing various aspects of the filter agitator; however, a full array of fins is contemplated despite being omitted), according to one or more embodiments of the present disclosure.

Each fin of the filter agitators can be arranged in a tilted configuration. As used herein, the term tilted configuration generally refers to an orientation of a fin relative to a certain defined axis. In some embodiments, the tilted configuration is defined by reference to an angle measured from a vertical axis to a top surface or edge of each fin. See, for example, FIG. 8, which provides a partial view of a filter agitator 800 including a plurality of fins 801A, 801B, 801C, 801D, 801E, 801F oriented in a 90° tilted configuration relative to a central vertical axis 805, according to one or more embodiments of the present disclosure. As shown, the 90° tilt is defined in reference to the vertical axis. A 90° tilted configuration can be referred to herein as a no-tilt or zero-tilt configuration. The angle of the tilt is not particularly limited and can be in the range of about 0° to about 360°, preferably about 0° to about 180°, or more preferably about 0° to about 90°. Other configurations are provided in FIGS. 9-11 which provide partial views of filter agitators in various tilted configurations, according to one or more embodiments of the present disclosure. FIG. 9 is a partial view of a filter agitator 900 including a plurality of fins 901A, 901B, 901C, 901D, 901E oriented in a 70° tilt configuration relative to a central vertical axis 905, according to one or more embodiments of the present disclosure. FIG. 10 is a partial view of a filter agitator 1000 including a plurality of fins 1001A, 1001B, 1001C, 1001D, 1001E oriented in a 80° tilted configuration relative to a central vertical axis 1005, according to one or more embodiments of the present disclosure. FIG. 11 is a partial view of a filter agitator 1100 including a plurality of fins 1101A, 1101B, 1101C, 1101D, 1101E oriented in a 60° titled configuration relative to a central vertical axis 1105, according to one or more embodiments of the present disclosure.

Figure 12:
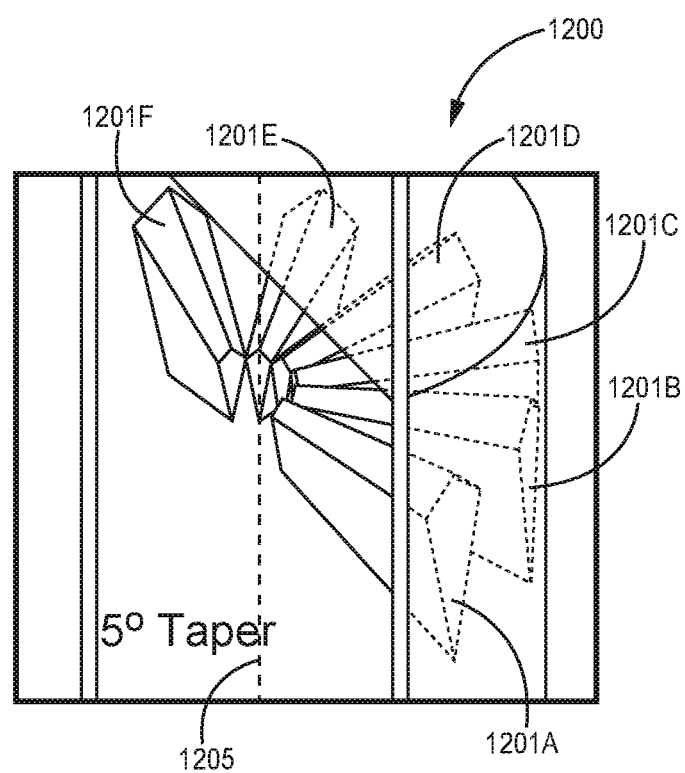
FIG. 12 is a perspective view of a filter agitator (the drawing omits about one-half of the fins to aid in showing various aspects of the filter agitator; however, a full array of fins is contemplated despite being omitted), according to one or more embodiments of the present disclosure.

The fins of the filter agitators can have tapered ends. As used herein, the term tapered end refers to fins with a variable cross section that can either increase or decrease along a horizontal axis from a proximal end to a distal end of each fin. At least one advantage of tapered ends is that a smaller cross-sectional area of a fin can increase water velocity and that increase in water velocity can achieve a scrubbing action to further dislodge solids from the surfaces of the beads. One example of a tapered end is presented in FIG. 12, which provides a partial view of a filter agitator 1200 including a plurality of fins 1201A, 1201B, 1201C, 1201D, 1201E, 1201F with a 5° taper, according to one or more embodiments of the present disclosure. As shown, the 5° taper is defined in reference to a horizontal axis and measured at the proximal end of the fin. The horizontal axis, for example, may be referred to as an axis or plane oriented substantially perpendicular to the central vertical axis 1205. Alternatively, the angle can be measured at the distal end. In general, the angle of the taper is not particularly limited and can be in the range of about 0° to about 360°, preferably about 0° to about 180°, or more preferably about 0° to about 90°.

Figure 13:
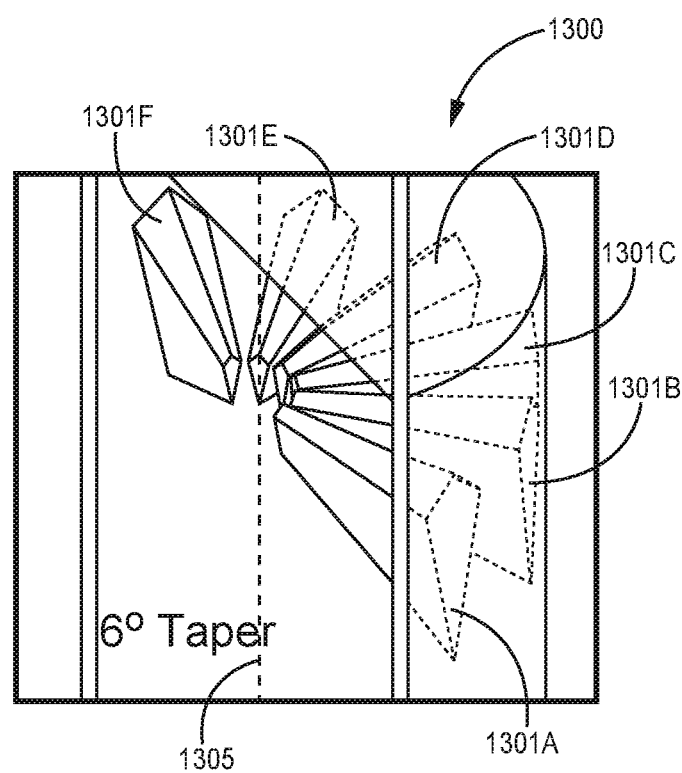
FIG. 13 is a perspective view of a filter agitator (the drawing omits about one-half of the fins to aid in showing various aspects of the filter agitator; however, a full array of fins is contemplated despite being omitted), according to one or more embodiments of the present disclosure.
Figure 14:
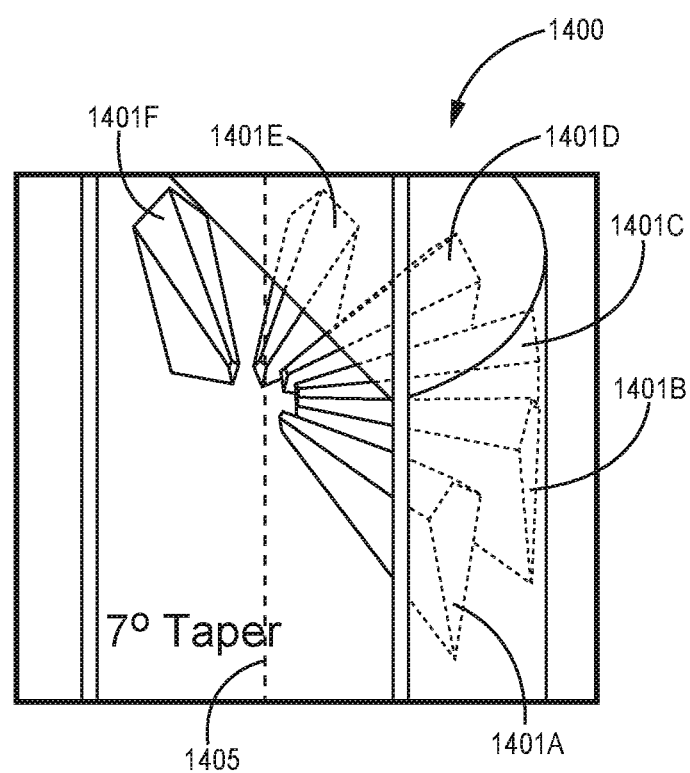
FIG. 14 is a perspective view of a filter agitator (the drawing omits about one-half of the fins to aid in showing various aspects of the filter agitator; however, a full array of fins is contemplated despite being omitted), according to one or more embodiments of the present disclosure.

Other configurations are provided in FIGS. 13-14 which provide partial views of filter agitators in various tapered configurations, according to one or more embodiments of the present disclosure. FIG. 13 is a partial view of a filter agitator 1300 with a 6° taper, according to one or more embodiments of the present disclosure. The filter agitator includes a plurality of fins 1301A, 1301B, 1301C, 1301D, 1301E, 1301F having the 6° taper, wherein the horizontal axis, for example, may be referred to as an axis or plane oriented substantially perpendicular to the central vertical axis 1305. FIG. 14 is a partial view of a filter agitator 1400 with a 7° taper, according to one or more embodiments of the present disclosure. The filter agitator 1400 includes a plurality of fins 1401A, 1401B, 1401C, 1401D, 1401E, 1401F having the 7° taper, wherein the horizontal axis, for example, may be referred to as an axis or plane oriented substantially perpendicular to the central vertical axis 1405.

Figure 15:
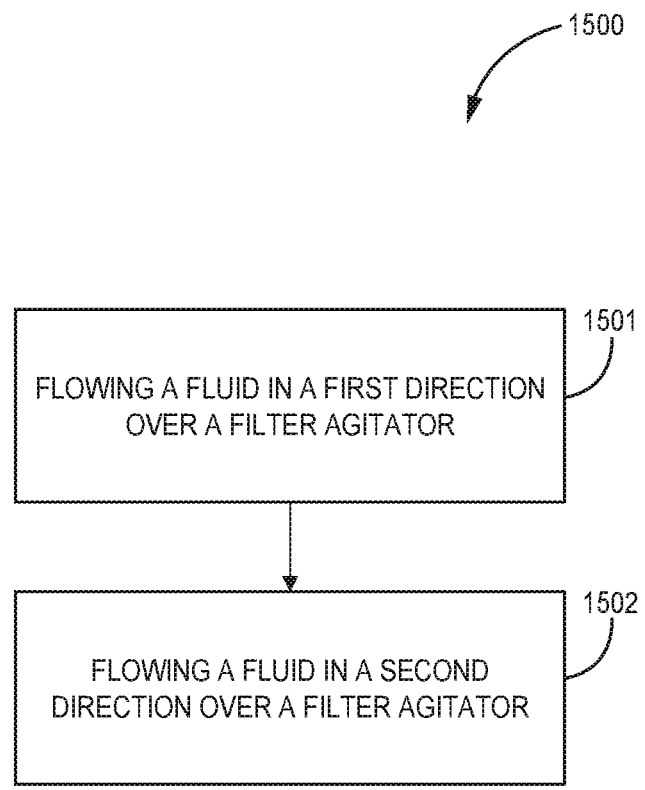
FIG. 15 is a flowchart of a method of using a filter agitator, according to one or more embodiments of the present disclosure.

FIG. 15 is a flowchart of a method of using filter agitators, according to one or more embodiments of the present disclosure. As shown, the method 1500 can comprise one or more of the following steps: flowing 1501 a fluid in a first direction over a filter agitator of the present disclosure, wherein the filter agitator promotes laminar flow of the fluid flowing in the first direction, and flowing 1502 a fluid in a second direction over the filter agitator, wherein the filter agitator induces turbulent flow of the fluid flowing in the second direction. In some embodiments, the method further comprises opening an air inlet to introduce air into an inner conduit formed by the proximal ends of the filter agitator.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto.

What is claimed is:

1. An aquaculture filtration unit, comprising:
a vessel including a fluid inlet for receiving a fluid from a fluid source and a fluid outlet for discharging fluid from the vessel, the vessel further comprising:
a plurality of first fins extending outwardly from a central vertical axis and arranged in a plane oriented substantially perpendicular to the central vertical axis, wherein the plurality of first fins is secured within the vessel and is configured to promote laminar flow of the fluid flowing in a first axial direction and promote turbulent flow of the fluid flowing in a second axial direction during a back-flushing phase.

2. The aquaculture filtration unit of claim 1, wherein the first fins are substantially equally spaced apart.

3. The aquaculture filtration unit of claim 1 further comprising a bead filter media in fluid communication with the plurality of first fins, wherein the minimum fin spacing between each of the first fins is greater than a diameter of the bead filter media.

4. The aquaculture filtration unit of claim 1 further comprising a bead filter media in fluid communication with the plurality of first fins, wherein the minimum fin spacing between each of the first fins is not greater than twice the diameter of the bead filter media.

5. The aquaculture filtration unit of claim 1, wherein a cross-sectional area of each first fin increases from a proximal end to a distal end.

6. The aquaculture filtration unit of claim 1, wherein each first fin has a kite-shaped or triangular-shaped cross-sectional area.

7. The aquaculture filtration unit of claim 1, wherein each first fin has a substantially upwardly facing surface comprising a plurality of protrusions.

8. The aquaculture filtration unit of claim 1, wherein each first fin has a substantially flat downwardly facing surface.

9. The aquaculture filtration unit of claim 1, wherein the proximal ends of the plurality of first fins forms an inner conduit.

10. An aquaculture filtration unit, comprising:
a vessel including a fluid inlet for receiving a fluid from a fluid source and a fluid outlet for discharging fluid from the vessel, the vessel further comprising:
a plurality of first fins extending outwardly from a central vertical axis and arranged in a plane oriented substantially perpendicular to the central vertical axis, wherein the plurality of first fins is secured within the vessel and is configured to promote laminar flow of the fluid flowing in a first axial direction and promote turbulent flow of the fluid flowing in a second axial direction during a back-flushing phase;
a plurality of second fins positioned above the plurality of first fins and extending outwardly from the central vertical axis, wherein the plurality of second fins is secured within the vessel and is configured to promote or further promote turbulent flow.

11. The aquaculture filtration unit of claim 10, wherein at least a portion of the second fins is positioned in the gaps formed between each of the first fins.

12. The aquaculture filtration unit of claim 10, wherein the plurality of second fins has a cross-sectional shape that is different from the plurality of first fins.

13. The aquaculture filtration unit of claim 10, wherein at least one of the first fins and second fins have tapered ends.

14. The aquaculture filtration unit of claim 10, wherein at least one of the first fins and second fins are arranged in a tilted configuration.

15. A filtration unit, comprising:
a vessel including a fluid inlet for receiving a fluid from a fluid source and a fluid outlet for discharging fluid from the vessel, the vessel further comprising:
a bead filter movably positioned within the vessel for providing mechanical and biological filtration of fluid flowing through the vessel;
a filter agitator disposed within the vessel and comprising a plurality of fins, each of the fins having a proximal end that forms an inner conduit, wherein the filter agitator is configured to promote laminar fluid flow in a first direction and turbulent fluid flow in a second direction; and
an air inlet provided in a bottom portion of the housing for introducing air into the inner conduit.

16. The filtration unit of claim 15, wherein the filtration unit is configured to operate in a filtering phase to facilitate the removal of solids and biological material from the fluid.

17. The filtration unit of claim 15, wherein the filtration unit is configured to operate in a back-flushing phase to dislodge solids and biological material from the bead filter.

18. The filtration unit of claim 15, wherein the vessel has a substantially constant diameter.

19. The filtration unit of claim 15, further comprising a structural member with grooves configured to receive and support the plurality of fins.

20. The filtration unit of claim 15, wherein the plurality of fins have a distal end that extends to about the vessel wall.

* * * * *